Oct. 17, 1944.    C. A. CADWELL    2,360,758
RAIL BONDING APPARATUS
Filed March 14, 1942    3 Sheets-Sheet 1
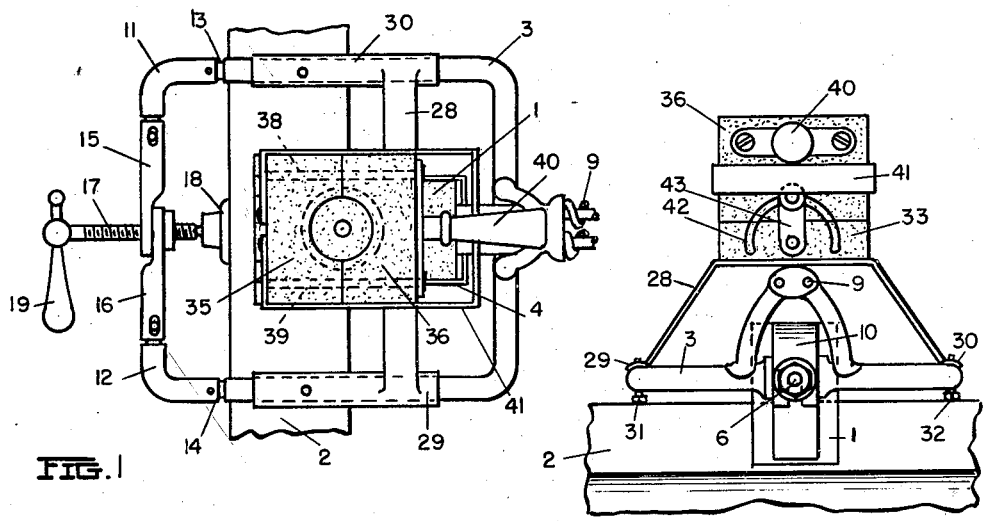
FIG. 1
FIG. 2
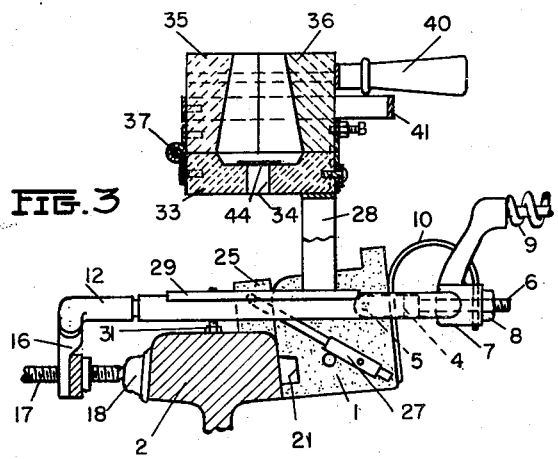
FIG. 3
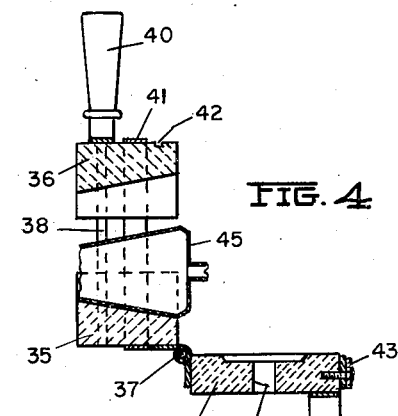
FIG. 4
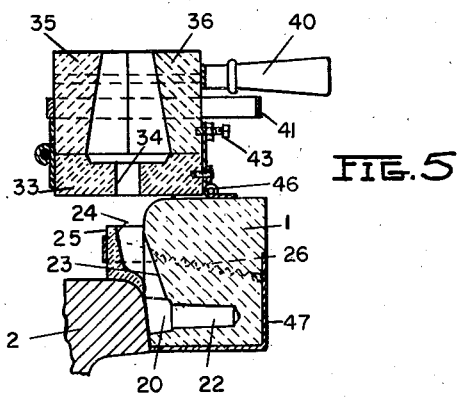
FIG. 5
INVENTOR.
CHARLES A. CADWELL
BY Oberlin, Limbach & Day
ATTORNEYS Oct. 17, 1944.  C. A. CADWELL  2,360,758
RAIL BONDING APPARATUS
Filed March 14, 1942  3 Sheets-Sheet 2
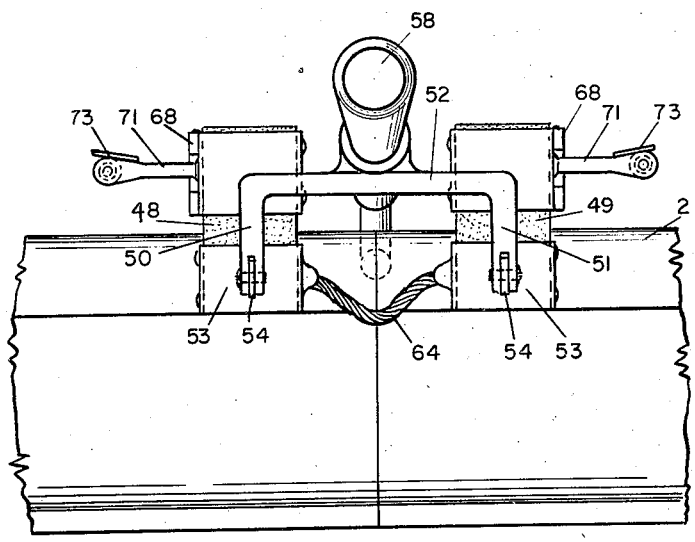
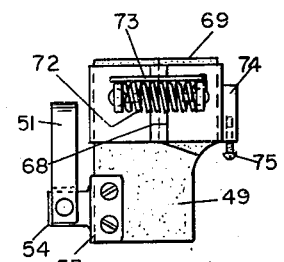
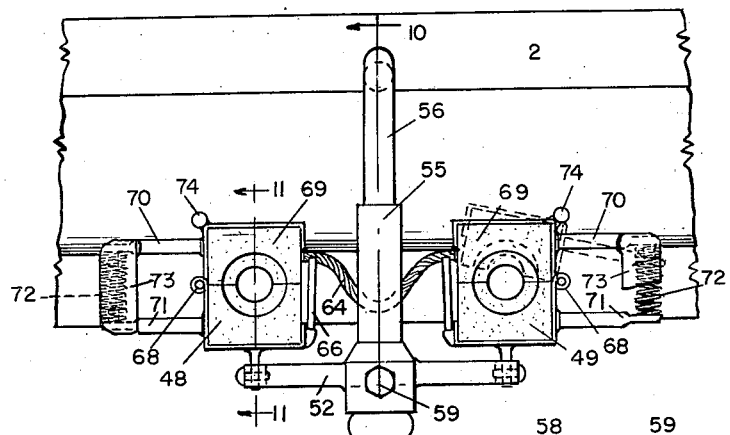
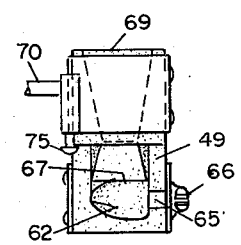
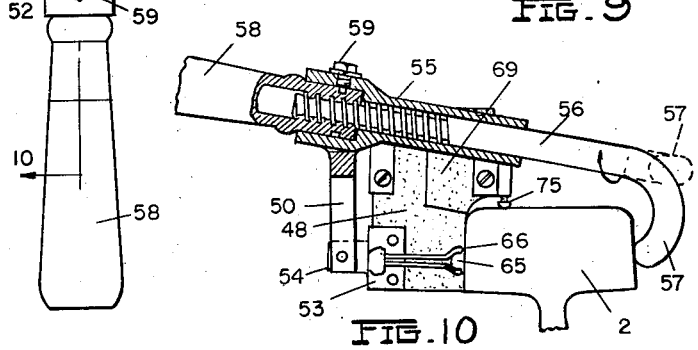
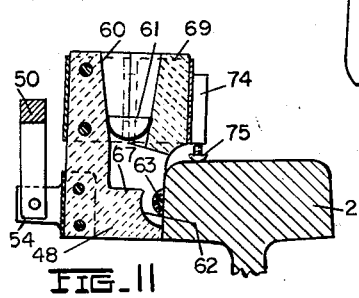
INVENTOR.
CHARLES A. CADWELL
BY Oberlin, Limbach & Day.
ATTORNEYS Oct. 17, 1944.  C. A. CADWELL  2,360,758
RAIL BONDING APPARATUS
Filed March 14, 1942  3 Sheets-Sheet 3

INVENTOR.
CHARLES A. CADWELL
BY Oberlin, Limbach & Day
ATTORNEYS

Patented Oct. 17, 1944

2,360,758

UNITED STATES PATENT OFFICE 2,360,758

RAIL BONDING APPARATUS

Charles A. Cadwell, Cleveland Heights, Ohio, assignor to The Electric Railway Improvement Company, Cleveland, Ohio, a corporation of Ohio Application March 14, 1942, Serial No. 434,701

16 Claims. (Cl. 22—116)

This invention relates as indicated to rail bonding apparatus, and more particularly to a form of apparatus designed for attaching railway signal conductors by cast welding the ends of such conductors to the rails. This application is a continuation-in-part of my copending application Serial No. 370,015 filed December 13, 1940; now Patent No. 2,276,832, dated March 17, 1942.

Various means have been suggested by workers in the art for cast welding the ends of rail bonds to rails, but such means have not generally been conducive to rapid attachment of the bonds or uniform in the results afforded. As disclosed in my Patent No. 2,229,045 and copending application Serial No. 375,099, filed January 21, 1941, I have developed a new method of attaching rail bonds to rails involving the use of an exothermic reaction for the production of the necessary weld metal and it is a particular object of the present invention to provide apparatus adapted for use in connection with such method.

It is a further object of this invention to provide apparatus which will be adapted for use in a rapid succession of operations with a minimum of time required to adjust the same to the rail and subsequently to remove the same from the cast terminal and prepare for the next operation.

Another object is to provide such apparatus which will be sturdy of construction and substantially fool-proof in operation so that relatively unskilled labor may be employed to manipulate the same.

Still another object of this invention is to provide means whereby the mold cavity may be substantially self-positioning in proper relation to the side of the rail head.

Other objects of this invention will appear as the description proceeds.

To the accomplishment of the foregoing and related ends, said invention, then, consists of the steps hereinafter fully described and particularly pointed out in the claims.

The annexed drawings and the following description set forth in detail one approved mode of carrying out the invention, such disclosed mode, however, constituting but one of the various ways in which the principle of the invention may be used.

In said annexed drawings:

Fig. 1 is a top plan view of one embodiment of my invention employing a split crucible adapted to facilitate removal of the slag left therein by the exothermic reaction;

Fig. 2 is an end view of such assembly including the crucible;

Fig. 3 is a side elevational view of such assembly with the crucible in cross section;

Fig. 4 is a sectional view of the crucible opened to permit removal of the slag;

Fig. 5 is an elevational view in cross section showing an alternative manner of mounting the crucible;

Fig. 6 is an end elevational view of another embodiment of my invention in which resilient means are employed to hold the split crucible together during the welding operation;

Fig. 7 is a top plan view of the embodiment of my invention illustrated in Fig. 6;

Fig. 8 is a side elevational view of one of the mold blocks shown in Fig. 6;

Fig. 9 is an elevational view of the rail contacting face of such mold block;

Fig. 10 is a fragmentary sectional view taken along the line 10—10 on Fig. 7;

Fig. 11 is a sectional view taken along the line 11—11 on Fig. 7;

Figure 12:
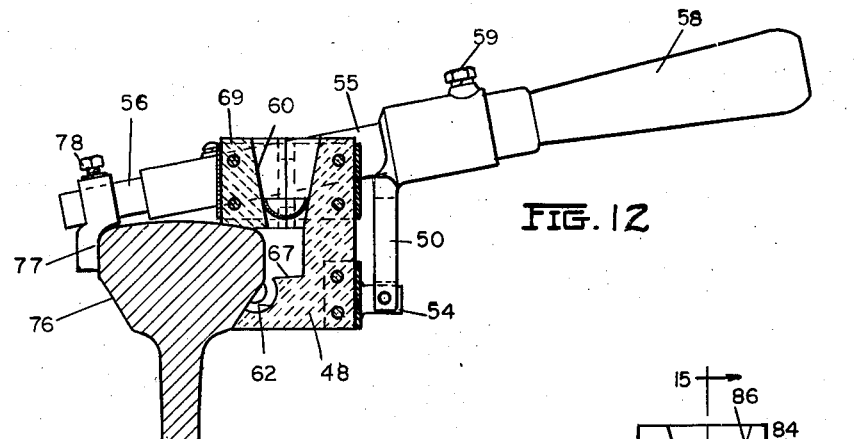
Fig. 12 illustrates a form of apparatus similar to that of Fig. 6 but modified for use with head-free rails.

Referring now more particularly to the drawings and especially Figs. 1 to 5, the apparatus there illustrated comprises a mold block 1 adapted to be held in close engagement with the side of the rail head 2. A tubular supporting frame 3 is provided to support such mold block which is secured in a clevis 4 by means of a pin 5 passing therethrough. Such clevis is in turn carried on the end of a threaded rod 6 passing through a boss 7 on frame 3 and secured by a nut 8. A handle 9 (shown broken in Figs. 1 and 3) is provided for ready manipulation of the device. A leaf spring 10 bears against the back of the mold block to urge the same against the face of the rail head.

Means for clamping the mold to the rail comprise angular extensions 11 and 12 of frame 3 pivotally mounted in such frame at joints 13 and 14, and overlapping members 15 and 16 slidably held in the respective ends of such extensions. A rod 17 having a high pitched thread is inserted in similarly threaded holes in the overlapping portions of such members and carries a loosely pivotally mounted clamping foot 18 at its inner end adapted to engage the side of the rail head opposite to that engaged by the face of the mold block. An unbalanced handle 19 is provided at the other end of rod 17 to facilitate quick clamping and unclamping of the device. Upon depressing such rod 17, as best shown in Fig. 3, the foot 18 is brought into position to engage the side of the rail head, and when it is desired to remove the apparatus from the completed terminal such clamping means may be elevated to clear the top of the rail. The mold may then be withdrawn laterally from the face of the rail and the apparatus removed. It will be apparent from the foregoing that such apparatus may be employed in very constricted places since, when it is desired to remove the same, only the mold block will be below the level of the rail head.

The rail engaging face of the mold block is hollowed out to provide a mold cavity 20 in which the terminal is cast with a smaller cavity 21 communicating with an adjacent end of the mold block and adapted to fit the body of the rail bond or conductor. When employing molten copper from an exothermic reaction as the welding metal it is generally desirable to provide an overflow cavity 22 communicating with the main mold cavity except in the case of the smallest sizes of signal bonds. The major portion of the metal which first enters the mold cavity will therefore pass around the end of the conductor into such overflow cavity so that the body of metal following, which forms the actual terminal, finds the rail head conductor end and mold cavity well heated upon arrival and a homogeneous weld will be produced without the occurrence of cold shot metal or incomplete coverage of the conductor end. A sprue passage 23 is also provided leading upwardly from the mold cavity, such passage being partly in the face of block 1 and partly formed by the complementary hollow 24 in the inner face of movable block 25. Springs such as 26 on either side of the mold block hold such movable block in close resilient engagement with the rail contacting face of the mold block and permit such movable block to be slid upwardly out of the way when it is desired to withdraw the mold block from a completed terminal. This permits ready removal of the mold block even though slag may have accumulated in the sprue passage. Tubular metal shells such as 27 serve to enclose and protect such springs particularly from damage by molten metal.

A crucible is provided for use in cooperation with the above-described mold, such crucible being mounted on an arch or bridge 28 in position so that the stream of molten metal discharging therefrom will fall into the above-described sprue passage formed by movable block 25. The arch is carried on semicylindrical feet 29 and 30 resting on frame 3 and positioned thereon by engagement of small pins 31 and 32 in holes through such feet. The heads of these pins are adapted to rest on the head of the rail.

The crucible above referred to comprises a bottom portion 33 with a sprue opening or tap hole 34 and an upper portion separable along a vertical line into two wall portions 35 and 36. Wall portion 35 is connected to the bottom portion of the crucible by a hinge 37 and to wall portion 36 by pins 38 and 39 permitting relative lateral movement of such wall portions (see Fig. 4). A handle 40 is secured to portion 36 to facilitate manipulation of the crucible parts and a metal band 41, attached to wall portion 35, circles the crucible and prevents complete withdrawal of portion 36 from such pins. A catch comprising a semi-circular groove 42 and a latch member 43 may be employed, although not absolutely necessary since relative movement of the component parts will generally be quite frictional. It will be noted that the inner walls of the crucible taper inwardly toward the upper opening.

In operation, the upper portion of the crucible is pivoted as a unit on hinge 37 and a metal slug or gate 44 placed over the sprue opening. The crucible is then closed and charged with the exothermic powder. Upon ignition of the powder, the reaction takes place, forming a mass of superheated metal which melts the slug and drops into the mold cavity to form the bond terminal. A layer or shell of slag 45 is left in the crucible which would be difficult of removal if it were not for the form of construction employed. The crucible is opened out, as shown in Fig. 4, the slag shell removed, and a new slug placed over the sprue opening. It is of course much simpler to properly place such slug when the crucible is thus divided along a horizontal line adjacent its bottom than when the slug must be dropped into the crucible and positioned by means of a rod, pencil, or the like. Since the crucible tapers inwardly toward the upper opening or neck, undue spattering is avoided during the rather violent reaction, particularly when employing relatively large charges to form terminals for the larger sizes of bonds. As shown in Fig. 5, this crucible may be hingedly attached directly to the mold block as by means of hinge 46, the crucible being tipped back to permit the raising of movable block 25 when it is desired to withdraw the mold from the completed terminal. It has often been found desirable to protect the lower portion of the mold block by casting thereon a thin copper shell 47 which thus perfectly supports the block, usually of graphite, and prevents damage thereto in use as well as facilitating machining operations in the formation of the mold cavity.

Referring now to the embodiment of my invention generally illustrated in Figs. 6 and 7, such apparatus is particularly adapted for use in the attachment of small signal bond conductors to the rail head with a minimum expenditure of time. The apparatus comprises a pair of mold blocks 48 and 49 which are mirror images of each other. They are carried by depending arms 50 and 51 of frame member 52, being supported by brackets 53 provided with tongues 54 pivotally held in the slotted ends of such arms (in the description of the mold units like numerals will be employed for like parts). The degree of pivotal movement is limited by the small extent of the slots in the ends of such arms. A tubular member 55 is rigidly secured to said frame member 52 and is adapted to receive clamping member 56 therein. Such clamping member is provided with a hooked end 57 adapted to be positioned to engage the side of the rail head opposite to that engaged by the mold blocks. The other end of the clamping member is threaded to engage corresponding threads in handle 58 so that as such handle is rotated member 56 may be retracted in tubular portion 55, thus clamping the mold blocks in firm engagement with the side of the rail head. The end of screw 59 fits in an annular slot in the extension of handle 58 so that such handle may be rotated while nevertheless secured in member 55. When it is desired to remove the apparatus from the rail head, it is not necessary to rotate the handle more than sufficiently to permit hooked end 57 to be swung as shown in dotted line in Fig. 10, since the apparatus and molds may then be backed off from the cast terminals.

The mold blocks themselves will generally be of graphite and are formed with the crucibles 60 integral therewith. Such crucibles are formed with a slightly downward taper of their inner walls without any sudden constriction to form a bottom portion having a sprue opening therein. Cup-shaped metal gates 61 are employed to close the lower end of the crucible when the same is charged with the exothermic material. Such gate of course is melted by the heat of the reaction, as above described. An advantage of this construction is that such gates will always fit in the crucible and automatically position themselves therein despite slight variations in the size of such gates and gradual wearing of the walls of the crucible. The mold includes the mold cavity proper 62 into which the end 63 of the bond 64 will extend and wherein the terminal proper is cast. Another, smaller, cavity 65 extends from one end of such mold cavity 62 to an end of the block and is adapted to fit tightly about the body of the bond. Pronged gripper means 66 are provided just outside the outer opening of such cavity 65 to hold the bond in proper position as the apparatus is applied to the rail head. A shelf 67 is provided in the sprue passage leading from the crucible to mold cavity 62 for the purpose of spreading out the stream of molten metal as it drops from the crucible in order to avoid gouging or local penetration of the side of the rail head by the impingement thereagainst of an unbroken "pencil" stream of molten metal. Such shelf may be substantially flat, although generally slightly inclined toward the mold cavity.

The crucible portions of the mold blocks are vertically divided and jointed together by hinges 68 so that the portions 69 facing toward the rail may be swung to open the crucible, as shown in broken line on Fig. 7. Arms 70 and 71 extend from such hingedly movable portions 69 of the crucible and the mold blocks respectively. The ends of such arms are maintained in spaced relation by means of compression springs 72 therebetween, thus normally tending to hold the two halves of the crucible together in closed position. Flat metal shields 73 are provided attached to arms 70 which serve to protect the springs from any hot molten spatterings which might otherwise injure the same. Hingedly movable members 69 are also provided with corner posts 74 having adjusting screws 75 inserted therein, such screws serving to adapt the apparatus to the height of the rail head which may vary due to wear, as shown in Fig. 10.

The operation of the apparatus is obvious from the above description. It should be noted, however, that this construction permits very quick removal of slag from the crucible without danger of burning the fingers or the necessity of complicated manipulation of the device. After removing the apparatus from the rail the same may be simply inverted and the arms 70 struck a sharp blow as with a screw driver or a pair of pliers. Such blow will cause the movable portion of the crucible to swing open and such action, in combination with the jar caused by the blow, effectively discharges the shell of slag. The crucible of course automatically and immediately snaps shut again and the apparatus is at once ready for the next bonding operation.

Referring now to Fig. 12 of the drawings, a form of the above described apparatus is here illustrated which is especially adapted for use on head-free rails such as 76. While generally similar to the apparatus of Fig. 6, the rail contacting face of the mold block with mold cavity 62 is shaped to fit against the slanting portion of such rail head so that the bond terminal will be cast just below the initial overhang. Also an adjustable clamping foot 77 is provided which may be positioned as required on member 56 and there secured by means of set screw 78. Otherwise, the mechanical operation of the apparatus is as above described. It will be noted that clamping foot 77 is rather shorter than hook member 57 and that such clamping foot is adapted to bear on the upper corner of the rail head as viewed in cross section. Since the mold block is supported by arm 50 adjacent its lower end, it will be seen that when the apparatus is tightly clamped in position that portion of the mold block containing the mold cavity will be diametrically opposite clamping foot 77 and the line of clamping pressure will be substantially straight. This serves to obviate any tendency for the apparatus to rotate about the rail head.

Figure 14:
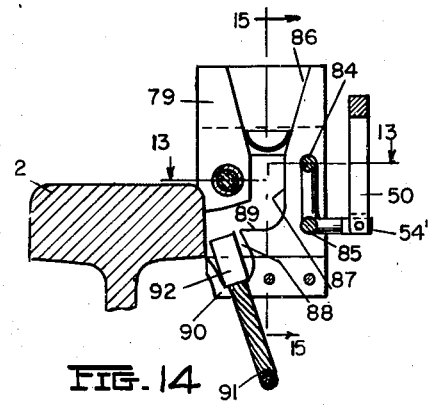
Fig. 14 is a side elevational view of one segment of such mold block taken along the line 14—14 on Fig. 13.
Figure 13:
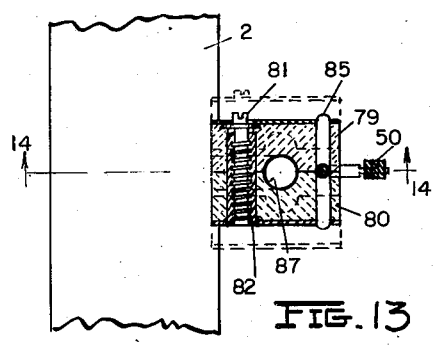
Fig. 13 is a horizontal sectional view taken along the line 13—13 on Fig. 14 and showing a modified form of mold block adapted for use with "bootleg" bonds and other bonds the ends of which are adapted to be attached in a substantially vertical position.
Figure 16:
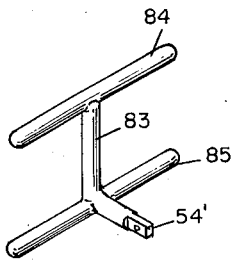
Fig. 16 is a detail view of the means supporting and guiding the segments of such mold block.
Figure 15:
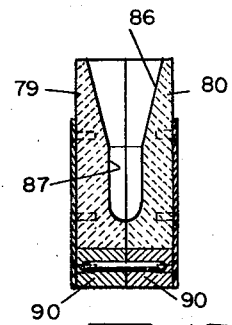
Fig. 15 is a vertical sectional view taken through bond segments of such mold block along the line 15—15 on Fig. 14.

Figs. 13 to 16 illustrate an alternative form of mold block which may be substituted for a mold block of the type described above when it is desired to attach bonds to the rail head with the bond itself assuming a substantially vertical position, as illustrated in Fig. 14. The mold block according to this embodiment is formed of two complementary sections 79 and 80 adapted to be spread apart and drawn together by means of a screw 81 in a threaded socket 82. The mold is supported by, and the two halves slidable on, a metal frame 83 having upper and lower arms 84 and 85 fitting in holes in said mold block portions. Tongue 54' is adapted to be pivotally secured in the slot in the lower end of arm 50 as above described. Each of the two mold block portions are hollowed out to respectively provide one-half of a crucible 86, one-half of a sprue passage 87 and one-half of the mold cavity proper 88. A shelf portion 89 is likewise provided. The lower portion of the mold cavity is formed of complementary blocks of copper 90. The bottom of the mold cavity is cut away sufficiently where the two copper blocks abut to permit the body of the rail bond conductor 91 to be held therein with the sleeved end 92 positioned in the mold cavity. Of course the two blocks must be spaced apart somewhat to permit such insertion of the sleeved end of the conductor. After the terminal has been cast in the manner above described, it is obvious that the mold block cannot be merely backed away from the terminal in the manner previously explained. A few turns of screw 81, however, quickly draw the two halves of the mold block apart, leaving sufficient space for the body of the conductor to pass therebetween as the mold is withdrawn.

It will be seen from the foregoing that I have provided rail bonding apparatus, particularly apparatus embodying split crucibles and mold blocks, especially adapted to facilitate the rapid attachment of rail bonds to rails by cast welding as when employing welding metal produced by an exothermic reaction.

Other modes of applying the principle of my invention may be employed instead of the one explained, change being made as regards the means herein disclosed, provided the means stated by any of the following claims or the equivalent of such stated means be employed.

I therefore particularly point out and distinctly claim as my invention:

1. In combination, a mold comprising a block of refractory material having a rail engaging face, a main cavity in such face wherein the bond terminal is adapted to be cast, a smaller cavity extending to an adjacent end of the mold block adapted to closely fit the body of a bond with the end of such bond extending into said main cavity, a sprue passage leading from above to said main cavity; and a crucible adapted to communicate at its lower end with said sprue passage, said crucible having an upper opening of smaller diameter than the interior cavity and a sprue opening leading downwardly from such cavity, said crucible being separable into complementary portions along a substantially horizontal line at the point of greatest diameter of such cavity.

2. In combination, a mold comprising a block of refractory material having a rail engaging face, a main cavity in such face wherein the bond terminal is adapted to be cast, a smaller cavity extending to an adjacent end of the mold block adapted to closely fit the body of a bond with the end of such bond extending into said main cavity, a sprue passage leading from above to said main cavity; and a crucible adapted to communicate at its lower end with said sprue passage, said crucible being separable into component parts along a substantially horizontal line adjacent its bottom.

3. In combination, a mold comprising a block of refractory material having a rail engaging face, a main cavity in such face wherein the bond terminal is adapted to be cast, a smaller cavity extending to an adjacent end of the mold block adapted to closely fit the body of a bond with the end of such bond extending into said main cavity, a sprue passage leading from above to said main cavity; and a crucible having a cavity of greater width adjacent its bottom than at its neck, such bottom portion being separable from the remainder of the crucible along a substantially horizontal line.

4. A mold block for use in the cast welding of rail bonds to rails, comprising a graphite block hollowed out in its upper portion to form a crucible and in its lower portion to form a mold cavity in the rail-engaging face of the block, a sprue passage connecting said crucible and cavity, said crucible being hingedly separable along a substantially vertical line, and resilient means urging said crucible to closed position.

5. A mold block for use in the cast welding of rail bonds to rails, comprising a graphite block hollowed out in its upper portion to form a crucible and in its lower portion to form a mold cavity in the rail-engaging face of the block, a sprue passage connecting said crucible and cavity, said crucible being hingedly separable along a substantially vertical line, arms extending laterally from said crucible on either side of such hinge, and a compression spring interposed between the ends of said arms tending to urge said crucible to closed position.

6. A supporting frame adapted to hold mold blocks in engagement with the side of a rail head, comprising a frame having depending arms adapted to support the mold blocks, a tubular portion, a threaded member inserted in said tubular portion and adapted to engage the side of the rail head opposite to that engaged by such mold blocks, and a handle member having a threaded extension adapted to receive the threaded end of said threaded member, said threaded member being moved from clamping to unclamping position by rotation of said handle.

7. Apparatus for cast welding rail bonds to rails comprising a supporting frame adapted to engage the rail in clamping position, arms depending from said frame, a pair of spaced graphite mold blocks supported by said arms adjacent their lower ends, a mold cavity in the lower portion of the rail-engaging face of each block, a crucible in the upper portion of said block, a sprue passage having a step therein connecting said crucible and mold cavity, said crucible being hingedly separable along a substantially vertical line, resilient means urging said crucible to closed position, and vertically adjustable stop members attached to the crucible portions of said mold blocks adapted to rest upon the upper surface of the rail head.

8. In apparatus for cast welding rail bonds to rails, two complementary mold portions of graphite together defining a crucible, a mold cavity open to the rail contacting face of the mold, and a sprue passage leading from such crucible to such mold; the bottom of such cavity being of copper and having an opening therein adapted to receive the rail bond conductor with the end of such conductor extending into such cavity, the line of division of said mold portions passing through such opening; and clamping means releasably securing said complementary portions in close engagement.

9. In apparatus for cast welding rail bonds to rails of the head-free type, a mold adapted to receive the end of a bond conductor positioned against one side of the rail head, a frame supporting said mold adjacent its lower end, hingedly connected members pivotally attached to said frame about parallel axes spaced in the line of the rail to be bonded, and a transversely acting clamp carried by said members adjacent the hinged connection therebetween.

10. In apparatus for cast welding rail bonds to rails of the head-free type, a mold adapted to receive the end of a bond conductor positioned against one side of the rail head, a frame supporting said mold adjacent its lower end, hingedly connected extensible members pivotally attached to said frame about parallel axes spaced in the line of the rail to be bonded, and a transverse, screw-actuated clamp carried by said members adjacent the hinged connection therebetween.

11. In apparatus for cast welding rail bonds to rails, a mold having a cavity open to the rail contacting face thereof and a sprue passage leading to such cavity, the bottom of the latter being of copper and having an opening therein adapted to receive the rail bond conductor with the end of such conductor extending into such cavity.

12. Apparatus for use in cast-welding rail bonds to rails comprising a mold adapted to receive the end of a bond and hold the same in contact with the side of the rail, a rectangular supporting frame for said mold adapted to rest on the rail top, one side portion of said frame being downwardly movable relative to the remainder of said frame from a position above to a position below the top of the rail, and clamping means carried by such movable frame portion operative to engage the side of the rail opposite to said mold.

13. Apparatus for use in cast-welding rail bonds to rails comprising a mold adapted to receive the end of a bond and hold the same in contact with the side of the rail, a frame, a clevis carried by said frame and adapted to pivotally support said mold therein, and a leaf spring attached to said frame and bearing on the face of said mold opposite to the rail-engaging face thereof whereby to resiliently press said mold forwardly and at the same time restrain pivotal movement of said mold in said clevis.

14. A mold for use in cast-welding rail bonds to rails comprising a block of refractory material having a cavity in its rail-engaging face in which the end of a bond is adapted to be positioned, and gripper means located adjacent the outer end of such cavity and adapted detachably to engage such bond and hold the same in place.

15. A mold for use in cast-welding rail bonds to rails comprising a block of refractory material having a cavity in its rail-engaging face in which the end of a bond is adapted to be positioned, and pronged gripper means associated with such mold adapted detachably to engage such bond where it emerges from such cavity and hold the same in place.

16. In apparatus for cast welding rail bonds to rails of the head-free type, a mold adapted to receive the end of a bond conductor positioned against one side of the rail head, a frame supporting said mold adjacent its lower end, and a clamping member movably associated with said frame so as to be vertically movable relatively to such rail head when said mold is thus supported, whereby said member is operative in one position to engage the side of such rail head opposite such mold and in another position to clear the top of such rail head without change in position of said mold.

CHARLES A. CADWELL.